No. 607,208. Patented July 12, 1898.
C. N. BAKER.
HAND SEED PLANTER.
(Application filed Oct. 6, 1897.)
(No Model.)
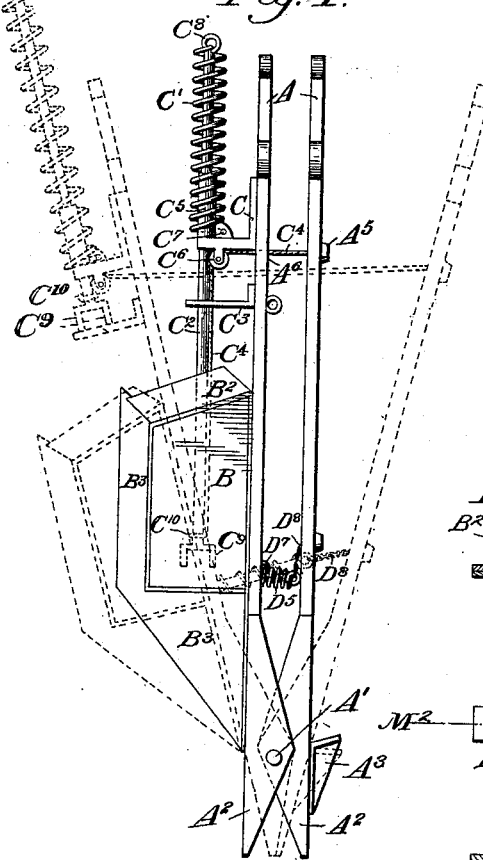
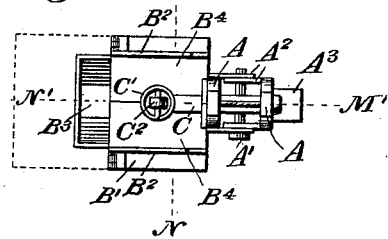
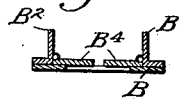 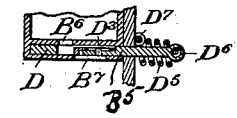
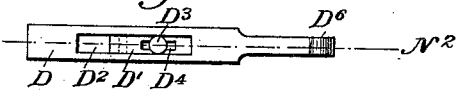
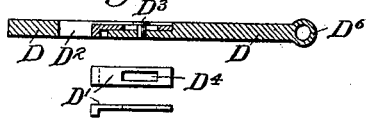
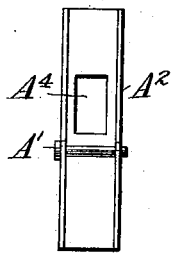
Witnesses.
J. M. Willis.
C. L. Leonard.
Inventor.
Cyrus Newton Baker,
By Oliver A. Perrin,
His Attorney.
THE NORRIS PETERS CO., PHOTO-LITHO., WASHINGTON, D. C.

UNITED STATES PATENT OFFICE.

CYRUS NEWTON BAKER, OF NICHOLASVILLE, KENTUCKY, ASSIGNOR, BY DIRECT AND MESNE ASSIGNMENTS, TO CHARLES H. HARNELL AND WALTER H. HEARN, OF CRAWFORDSVILLE, INDIANA.

HAND SEED-PLANTER.

SPECIFICATION forming part of Letters Patent No. 607,208, dated July 12, 1898.

Application filed October 6, 1897. Serial No. 654,311. (No model.)

*To all whom it may concern:*

Be it known that I, CYRUS NEWTON BAKER, a citizen of the United States, residing at Nicholasville, in the county of Jessamine and State of Kentucky, have invented a new and useful Improvement in Planters, of which the following is a specification.

My invention relates particularly to an improvement in portable hand-planters for planting potato, pumpkin, squash, or melon seed, corn, beans, &c., and has for its object the production of a planter of the character described; and to this end my invention consists in the peculiar construction, combination, and arrangement of the several parts, as will be fully set forth in the following description and claim.

Referring to the accompanying drawings, forming a part of this application, in which like letters of reference indicate corresponding parts throughout the several views, Figure 1 is a side elevation of my invention entire. Fig. 2 is a top plan view of the same. Fig. 3 is a transverse section of the hinged lid B on the line M N, Fig. 2. Fig. 4 is a vertical transverse section of the seedbox-bottom B and its movable seed-bar D on the line M' N', Fig. 2. Fig. 5 is a detail plan view of the movable seed-bar D. Fig. 6 is a longitudinal section of the same on the line $M^2 N^2$, Fig. 5. Fig. 7 is an enlarged detail view of the metallic cutter $A^2$. Fig. 8 is a top plan of the seed-fork $C^3$.

In the construction of my invention I use a pair of parallel handle-bars A A, seedbox B, a potato-seed lifting and dropping mechanism C, and a seed-dropping mechanism D. The handle-bars A are hinged at A' at their lower ends and have a bent metallic cutter $A^2$ mounted on the lower end of each bar, which enables them to easily penetrate the ground. The step $A^3$ is secured on the lower outer side of the metallic cutter $A^2$ for forcing the point of the cutters into the ground, if necessary, when planting. One of the cutters $A^2$ has a slot $A^4$, through which the seeds fall into the cutter-pocket, which when the handle-bars are closed and withdrawn allows the dirt to close in over the seeds.

The rectangular seedbox B may be constructed of any suitable material and is rigidly fixed on the side of one of the handle-bars A. Its lid B' is hinged at its outer side for opening outwardly from the handle-bar A, which makes it more convenient for filling the seedbox, and has a pair of upstanding flanges $B^2$, which conduct the seed, when planting potatoes, toward the chute $B^3$, which conveys them to and through the slot $A^4$ into the cutter-pocket, which when the handle-bars are closed and withdrawn allows the dirt to close in over the seed. The lid B' also has a pair of trap-lids $B^4$, which are hinged at their outer sides adjacent the upstanding flanges $B^2$, while their free sides meet when closed and open upwardly when the seed-tongs $C^9$ lift the potato-seed up between them, which when the seed has been raised above them they close down again by their own gravitation and form an incline which conducts the potatoes that have been dislodged from the tongs $C^9$ by the outstanding fork $C^3$ into the chute $B^3$. The chute $B^3$, formed as a part of and on the outer side of the seedbox, narrows gradually toward the bottom, where it forms a triangular-shaped pocket that empties into the slot $A^4$ and conveys both large and small seed into the cutter-pocket. The bottom of the seedbox has a transverse rectangular groove $B^5$ for the reception of the movable seed-bar D. $B^6$ is an inlet-opening from the interior of the seedbox into said groove, and $B^7$ is an outlet-opening from the groove into the chute $B^3$.

The mechanism for lifting and dropping potato-seed from the seedbox comprises an outstanding bracket C, a spiral spring C', a vertically-movable plunger $C^2$, a seed-discharging fork $C^3$, and a cable $C^4$. The bracket C is secured on the upper outer side of one of the handle-bars A and has a vertical tubular sleeve $C^5$ for the reception of the movable seed-plunger $C^2$. $C^6$ is a small sheave secured on the under side of the bracket adjacent said plunger, over which the cable $C^4$ operates. The spiral spring C' encircles the tubular sleeve $C^5$ and the upper end of the movable plunger $C^2$ and has its lower end secured in an opening in a bracket $C^7$ and its upper end fixed in an eyelet $C^8$ of the seed-plunger, which enables it to return the plunger to the seed when it has been impelled upwardly to the extreme limit of its travel. The movable plunger $C^2$, mounted longitudinally in the tubular sleeve $C^5$, has an eyelet $C^8$ for the reception of the upper end of the spiral spring and a pair of tongs $C^9$ at its lower end for penetrating the potato-seed, which it lifts out of the seedbox through the trap-lids $B^4$ when it is impelled inwardly. Any number of tongs $C^9$ desired may be used on the plunger. The fork $C^3$, secured to one of the bars A, has its outstanding fingers overhanging the tongs, which discharge the seed when the tongs pass between the fingers. The cable $C^4$ has its upper outer end secured in a small opening $A^5$ in one of the handle-bars A and passes inwardly through a slot at $A^6$ of the opposite handle-bar A, underneath the bracket C, over a small sheave $C^6$, adjacent the movable plunger, and down said plunger to an opening $C^{10}$, in which its lower end is securely fastened. The peculiar organization of this seed lifting and dropping mechanism enables it when the handle-bars are opened, as indicated by the dotted lines in Fig. 1, to impel the movable plunger upwardly to the extreme limit of its travel, and as the tongs $C^9$ pass the outstanding fingers of the fork $C^3$ the seeds are dislodged. The spiral spring $C'$ forces the movable plunger $C^2$ to the extreme limit of its downward travel in the box and the handle-bars A to their normal position. It will be observed that the tension of the spring $C'$ must be sufficient to impel the operating parts to their normal position and to thrust the tongs $C^9$ into the potato-seed.

The mechanism D for dropping the smaller seed—such as pumpkin, squash, or melon seed, beans, or corn—consists of a movable seed-bar D, which is longitudinally movable in the rectangular groove $B^5$ in the bottom of the box B and has an adjustable finger-bar $D'$, whereby the capacity of its seed-pocket $D^2$ may be increased or diminished, as may be desired. $D^3$ is a small set-screw which passes through the groove $D^4$ of the finger-bar $D'$ for rigidly fastening the finger-bar to the seed-bar. The seed-bar D, when in its normal position, has its seed-pocket $D^2$ immediately underlying the inlet-opening $B^6$ of the box, from which it fills with a charge of seed, and when the handle-bars A are opened, as shown in Fig. 1, the movable seed-bar D is drawn outward until its charged seed-pocket $D^2$ immediately overlies the outlet-opening $B^7$, and the charge of seed falls through into the chute $B^2$. A spiral spring $D^5$ encircles the projecting part of the seed-bar D and has its outer end secured in an eyelet $D^6$ of said bar and its inner end secured to an eyebolt $D^7$ of the handle-bar A. The spring $D^5$ forces the seed-bar D inward to its normal position.

$D^8$ is a small chain which connects the seed-bar D with one of the handle-bars $a$.

The operation of my invention is as follows: When planting potatoes, the pieces are deposited in the box when the hinged lid $B'$ is opened, as shown by the dotted line in Fig. 2, until the box is full, the lid closed, and the handle-bars A opened, as indicated by the dotted lines in Fig. 1, until the points of the metallic cutters $A^2$ meet to be thrust into the ground by pressure with the foot upon the step $A^3$, if necessary, during which operation the cable $C^4$ has drawn the seed-plunger $C^2$ upward to the extreme limit of its travel, which lifts a number of seed from the box that are dislodged from the tongs $C^9$ by the outstanding fingers of the fork $C^3$ and falls onto the inclined lid $B'$, which conducts the discharged seed into the chute $B^3$, from which they pass through the slot $A^4$ of the handle-bars into the cutter-pocket, when upon the handle-bars being closed and the cutters withdrawn from the ground the dirt closes in over the seed.

When planting corn, beans, and similar products, the cable $C^4$ is removed from its opening in the upper end of one of the handle-bars and fastened in a similar opening in the other slotted handle-bar A for putting it securely out of the way, which suspends the operation of the potato-seed mechanism; but the small chain $D^8$ is fastened in its opening in one of the handle-bars A, the seedbox B filled with corn, the handle-bars opened, as shown by the dotted lines in Fig. 1, until the points of the metallic cutters meet to be thrust into the ground, and during which the movable seed-bar D is drawn outward from the inlet-opening $B^6$ of the box until its charged seed-pocket overlies the outlet-opening $B^7$, when the charge of seed-corn falls into the chute $B^3$, from which it passes through the slot $A^4$ into the cutter-pocket, and upon closing the handle-bars and withdrawing the machine from the ground the dirt closes in over the seed. The seed-bar chain $D^8$ may be detached from its opening in the handle-bar, which suspends the operating mechanism for planting small seed.

In the above construction I produce a simple, durable, and efficient machine which may be conveniently adapted to a variety of planting purposes by gardeners and farmers.

Having thus fully described my invention and set forth the operation and advantages thereof, what I claim as new, and desire to secure by Letters Patent, is—

In a planter, the combination of a pair of hinged metallic cutters which have vertical operating-bars, a rectangular seedbox, a hinged lid having upstanding flanges and a pair of small hinged lids, a delivery-chute, and means of extracting rough seed from the box and discharging it into the delivery-chute, the same comprising a suitable bracket having a vertical tubular sleeve, a movable plunger, a spiral spring, a discharge-fork, and an operating-cable, all made in the manner and for the purposes set forth, substantially as specified.

CYRUS NEWTON BAKER.

Witnesses:
W. J. MILLER,
J. W. HUNTER.